United States Patent Office 3,372,224
Patented Mar. 5, 1968

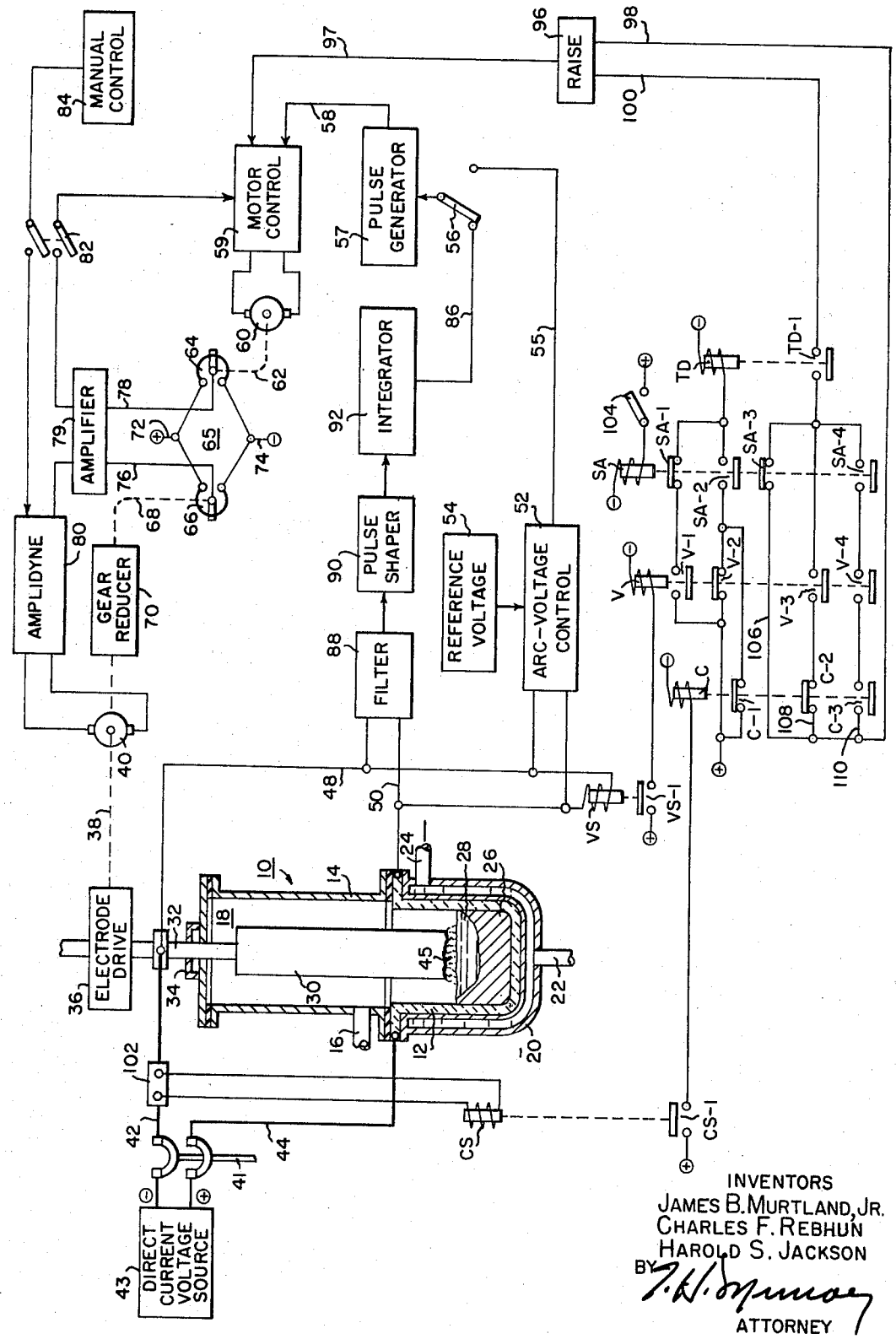

3,372,224
CONTROL SYSTEM FOR CONSUMABLE ELECTRODE ARC MELTING FURNACE TO RAISE THE ELECTRODE UPON A POWER FAILURE
Harold S. Jackson, Troy, N.Y., and James B. Murtland, Jr., and Charles F. Rebhun, Natrona Heights, Pa., assignors to Allegheny Ludlum Steel Corporation, Brackenridge, Pa., a corporation of Pennsylvania
Filed Sept. 15, 1964, Ser. No. 396,647
11 Claims. (Cl. 13—13)

The present invention relates to electrode regulators for arc melting furnaces, and more particularly to a system for controlling a consumable electrode arc melting furnace under conditions wherein an unscheduled power interruption occurs during the melting cycle.

Consumable arc melting furnaces are well known and usually comprise an electrode of the metal to be melted extending downwardly into a mold or crucible which receives the molten metal and within which an ingot is formed. The electrode is connected to one terminal of a direct current voltage source, and means are provided for electrically connecting the other terminal of the source to the mold and, hence, to the molten metal. Usually, in starting the melt, a small supply of chips or the like is placed in the mold so that when the arc is struck such chips are melted to form an initial molten metal supply in the crucible mold. As the arc is maintained between the electrode to be melted and the molten pool of metal beneath it, the end of the electrode is melted due to the heat of the arc. As the electrode is melted, it is deposited in and forms the aforesaid molten pool, the bottom portion of which continuously solidifies as the electrode melts to form an ingot which increases in length, starting from the bottom upwardly. In this process, impurities float to and on the top of the molten pool; and assuming that the pool does not solidify during the formation of the ingot, the major portion of the impurities will be excluded from the main body of the ingot.

Such furnaces are usually employed to melt high quality stainless steels, other high quality alloy steels, or reactive metals such as titanium, zirconium and their alloys. The melting process in such a furnace is usually carried out under vacuum or inert atmospheric conditions, the reason being that the presence of air will cause the formation of oxides which contaminate the resulting product. The grain structure and general quality requirements of the resulting ingot are most stringent. In this respect, it is oftentimes necessary or desirable to produce a resulting ingot having a substantially uniform grain structure throughout as well as to substantially completely eliminate inclusions, segregation, stringers and the like.

One of the problems associated with consumable electrode melting is an unscheduled power interruption during the melting cycle, either because of a short circuit or other factors which cause the circuit breakers between the power supply and the furnace to trip. When such a power failure occurs, it is necessary for an operator to manually reset the circuit breakers between the power supply and the furnace, and this may take several minutes. If the electrode is not moved upwardly and away from the molten pool during the time required for the operator to reset the circuit breaker, the molten pool, which is normally dish-shaped during melting, will seek a common level and will freeze to the electrode. This, of course, would prohibit further melting and result in a scrapped product.

Control systems for consumable electrode furnaces in accordance with the prior art dealt with the problem of an unscheduled power interruption by continually moving the electrode upwardly during the time required for the operator to reset the circuit breaker. Upon restoration of power when the circuit breaker was reset, the electrode was then moved back down toward the top of the ingot being melted a distance equal to the distance it had retracted. In other words, if the power was interrupted for one minute, the ram was moved upwardly for one minute, and upon restoration of the power the ram then had to travel downwardly for one minute. Consequently, a total time lapse of two minutes would have ensued under the conditions assumed; and if the time lapse of a power interruption is of the order of three minutes, a total time lapse of six minutes would have ensued under the conditions assumed, the longer the period of arc power interruption, the greater the probability for rejection of the ingot which has been in the process of being melted either because of the inclusion of impurities, a faulty grain structure, or other factors. For that matter, power interruptions of this sort have been a continual and serious problem associated with consumable electrode furnaces and have been responsible for the rejection of a relatively large number of ingots.

As an overall object, the present invention seeks to provide apparatus for controlling a consumable electrode arc furnace under conditions wherein an unscheduled power interruption occurs, which apparatus minimizes or eliminates the possibility of deleterious effects to the ingot being formed.

Another object of the invention is to provide a new and improved system for controlling the initial establishment of an arc in a consumable electrode furnace.

Still another object of the invention is to provide apparatus for controlling the electrode of a consumable electrode furnace upon the occurrence of a short circuit.

While not limited thereto, the present invention is particularly adapted for use with an electrode regulating system such as that described in our copending application Ser. No. 270,087, filed Apr. 2, 1963 and assigned to the assignee of the present application. Previous to the invention described in that application, most systems for maintaining the arc gap of a consumable electrode furnace relied upon arc voltage (i.e., the voltage gradient across the gap) for regulating purposes. That is, the arc voltage, or approximation thereof, was detected and this voltage utilized to drive a motor which raised or lowered the electrode, as the case may be, to maintain the arc gap.

Apparatus for regulating the position of the electrode, which relies upon the arc voltage for regulating purposes, is not completely satisfactory since there is only a small change of arc voltage with arc gap length in the range of gap lengths normally used. Furthermore, the voltage drop across the arc is influenced by variables other than the length of the arc such as the pressure within the mold which may change abruptly upon the liberation of gases in the melting process. In addition, the arc voltage usually cannot be measured directly, and when the control voltage is derived from terminals connected to the electrode and the mold, the control voltage is affected by the voltage drops through the contacts, which may vary during the melting of the metal. Consequently, if the electrode is positioned so that a constant voltage is maintained between the electrode support and the molten metal, the length of the arc gap is not necessarily or consistently within the desired range.

The invention described in the aforesaid copending application Ser. No. 270,087 is based upon the discovery of an electrical characteristic of the arc gap unknown before that invention. Specifically, it was found that superimposed on the base arc gap voltage are voltage discontinuities in the form of pulses, each of which represents a momentary increase in the impedance across the gap and persists for a short time such as forty milliseconds. Characteristically, these arc voltage discontinuities occur in groups or bunches at a frequency or repetition rate of below about thirty cycles per second which is the minimum frequency of any ripple content in the direct current voltage. Above a certain arc voltage, (i.e., wide arc gap) and immediately after some arc disturbances such as a short, the voltage discontinuities do not occur; however as the arc length is decreased, the discontinuities appear at what is believed to be optimum operating conditions. Surprisingly enough, and in contrast to what might be expected, these voltage discontinuities may be used in a servo system for controlling the arc gap.

Thus, it has been found that the voltage across the arc actually consists of two components. The first component may be termed "base voltage" which is comprised of an anode voltage drop, plasma voltage drop and cathode voltage drop. On an instantaneous basis, the change in this base voltage with a change in arc length is usually referred to as the voltage gradient of the arc plasma. The second component of arc voltage, for want of a better name, may be termed "hash" which comprises the voltage discontinuities mentioned above. In the specification which follows, these discontinuities, which result from increases in the impedance across the gap as aforesaid, are referred to as "hash" pulses. It has been found that the presence or absence of this hash has a substantial effect upon the melt rate, with very little change in apparent input power to the furnace. Where the hash is present during melting, the melt rate is found to be higher. Where melting is accomplished in the absence of the hash condition and at a substantially constant arc voltage, a relatively uniform melt rate is also obtained but at a much lower rate than that obtained with hash present. Furthermore, with hash present, the melt rate can be increased without an appreciable increase in power input; and under certain conditions power input actually appears to decrease with an increased melt rate when the hash component of the arc voltage is present. While many theories have been advanced as to why the hash pulses occur, there is no question but that their presence indicates optimum operating conditions and that they can be used to control the position of the electrode with surprisingly good results.

As will be understood, the voltage discontinuities or hash and accompanying momentary increases in impedance give rise to other fluctuations in an electrical characteristic of the arc gap, such as current discontinuities which can be used for purposes of control. The current discontinuities, for example, comprise decreases in arc current which can be used in a control system in the same manner as the hash voltage pulses.

While the present invention is particularly adapted for use with a "hash" control system of the type described in the aforesaid copending application Ser. No. 270,087, it also has applicability to a standard arc voltage control system; and, in any event, even the "hash" control system employs arc voltage control during a portion of the operating cycle. The reason for this is that the "hash" or voltage discontinuities mentioned above are not present continually in the arc voltage, but only when the arc gap is within a predetermined optimum range as is more fully explained in the aforesaid copending application Ser. No. 270,087.

Because the hash occurs only within a predetermined arc gap range, it was considered necessary, previous to this invention, to incorporate into the control system means for sensing a predetermined high arc voltage level as well as a predetermined low arc voltage level and to switch the control system back to arc voltage control when these voltage limits are exceeded. Such a provision was considered necessary in order to facilitate initiation of the arc at the beginning of an electrode melting process when the hash does not occur, to facilitate lowering of the electrode under conditions where the arc gap is greater than that at which hash occurs, and to raise the electrode upon the occurrence of a possible short circuit.

In accordance with the present invention, hash control or arc voltage control is used to move the electrode downwardly, but never upwardly. The system is such that it will initially move the electrode downwardly under arc voltage control to strike the arc and withdraw the electrode a predetermined amount upon the establishment of melting current. This is particularly desirable since upon initially striking an arc, no molten pool is established and the arc behavior at this point is extremely erratic, making the use of hash as a control parameter somewhat undersirable. Upon the occurrence of a short circuit during normal melting, the absence of arc voltage is sensed and the ram drive system is permitted to withdraw the electrode whatever amount is necessary to clear the short circuit. In the event of a power failure, the system will sense that although there is zero voltage due to the power failure, there is also zero current flowing. Upon sensing both zero voltage and zero current, the system will immediately effect a withdrawal of the electrode a predetermined amount, which is set to be adequate to prevent the electrode from freezing into the molten pool. By limiting such withdrawal, and upon restoration of melting power, the electrode will automatically feed down and restrike the arc in a minimum time loss to prevent freezing of the pool. Thus, the time lost in a manual decision to drive down and restrike the arc is completely eliminated.

The above and other objects and features of the invention will become apparent from the following detailed description taken in connection with the accompanying single figure drawing which schematically illustrates the invention.

Referring now to the drawing, a consumable electrode arc furnace is schematically illustrated and identified by the reference numeral 10. The furnace comprises a conductive mold or crucible 12 which may, for example, be fabricated of copper. Covering the upper open end of the mold 12 is a gas-tight housing 14 having a connection at 16 to means, not shown, for evacuating the chamber 18 formed by the mold 12 and the housing 14 covering it. Alternatively, the chamber 18 could be filled with an inert gas; however in either case the metal to be melted is protected from oxidation. Surrounding the mold 12 is a water jacket 20 having inlet and outlet ports 22 and 24 connected thereto.

The mold 12 contains the ingot 26 which is formed from a molten pool 28 adjacent the lower end of an electrode 30 to be melted. Electrode 30 extends upwardly from the mold 12 and is connected at its upper end to a reciprocable rod or electrode ram carrier 32 which extends through a seal 34 in the housing 14. The ram 32 is connected to a suitable drive which may be mechanical or hydraulic; however in either case the drive is controlled by an electrical signal as will hereinafter be explained. In this particular embodiment, the electrode drive 36 comprises a rack and pinion, mechanical differential, chain or worm and screw arrangement connected through a shaft, schematically illustrated at 38, to a drive motor 40, the arrangement being such that as the motor 40 is rotated in one direction, the ram 32 and electrode 30 carried thereby will move upwardly; whereas rotation of the motor 40 in the opposite direction will cause downward movement of the electrode 30. During normal melting and in the absence of shorts or power failures, the ram 32 and electrode 30 move downward only.

Connected to the ram 32 and, hence, to the electrode 30 is a lead 42 which is also connected through one set of contacts of a circuit breaker 41 to the negative terminal of a direct current voltage source 43. The positive terminal of the same voltage source is connected through another pair of contacts of the circuit breaker 41 and lead 44 to the mold 12, the arrangement being such that an arc 45 will be struck between the lower end of the electrode 30 and the bottom of the mold 12, thereby forming heat which progressively melts the end of the electrode and causes the formation of the aforesaid molten pool 28.

While the specific circuit breaker 41 is illustrated herein, it will be appreciated that such circuit breaker will not be needed where a circuit breaker is provided on the alternating current supply, not shown, to the direct current voltage source 43. As electrode 30 is melted it is, of course, necessary to move it downwardly by means of the motor 40 and electrode drive 36 in order to maintain the desired arc gap.

The position of the electrode 30 with respect to the molten pool 28 to maintain the desired arc gap and a constant uniform melt rate is controlled, as mentioned above, as a function of an electrical characteristic of the arc. One such characteristic which has been used heretofore is the voltage gradient across the arc. Another characteristic, more fully described below, is the occurrence of voltage discontinuities in the form of hash pulses which are superimposed on the base arc gap voltage, each of which persists for a short period of time such as forty milliseconds at a frequency below thirty cycles per second. These hash voltage pulses give rise to current pulses comprising momentary decreases in arc current and periodic increases in the impedance of the arc which can also be used for purposes of control.

In accordance with the present invention, either arc voltage or "hash" is used to control downward movement of the electrode 30. These characteristaics, however, are never used to move the electrode upwardly. Downward movement under arc voltage control will be considered first. The arc voltage is applied through leads 48 and 50 to an arc voltage control circuit 52 where it is compared with a reference voltage from source 54. The difference voltage from circuit 52 may then be applied through lead 55 and switch 56 to a pulse generator 57 which produces output pulses on lead 58 having a frequency or repetition rate proportional to the difference voltage or error signal from circuit 52. The pulses on lead 58 are then applied through a motor control circuit 59 to a direct current servomotor 60. While the difference voltage from circuit 52 could be applied directly to motor control circuit 59 for the purpose of controlling the motor 60, conversion into pulses in circuit 57 insures better control of the direct current motor at low speeds, as will be readily appreciated by those skilled in the art.

The servomotor 60 is mechanically connected through a linkage, schematically illustrated at 62, to the movable tap on a first potentiometer 64. The potentiometer 64 is included in a bridge circuit arrangement 65 which includes a second potentiometer 66 having its movable tap connected through a mechanical linkage, schematically illustrated at 68, and gear reducer 70 to the drive motor 40, the arrangement being such that as the electrode 30 is moved downwardly by the motor 40, the tap on potentiometer 66 will be caused to advance in an amount proportional to the downward movement of the electrode. The bridge circuit 65 comprising the potentiometers 64 and 66 is energized from a source of voltage, not shown, through input terminals 72 and 74; while output signals from the bridge circuit configuration are applied through leads 76 and 78 and amplifier 79 to an Amplidyne (trademark) circuit 80 which, as will be understood, controls the motor 40.

It will be assumed that the movable tap on potentiometer 64 rotates in a clockwise direction while the tap on potentiometer 66 rotates in a counterclockwise direction during a melting operation with the electrode 30 moving downwardly. Prior to initiation of the melting operation, switch 82 is closed to connect manual control circuit 84 to Amplidyne 80 and to connect amplifier 79 to motor control circuit 59 for servomotor 60. The ram 32 is then moved to its uppermost position under manual control, thereby causing the tap on potentiometer 66 to move in a clockwise direction until it assumes its top dead-center position. By virtue of the fact that the output of amplifier, representing unbalance in the bridge 65, is now applied to circuit 59, the servomotor 60 causes the tap on potentiometer 64 to follow that on potentiometer 66. That is, the servomotor 60 will cause the tap on potentiometer 64 to rotate in a counterclockwise direction as the tap on potentiometer 66 rotates in a clockwise direction until both taps are at top dead-center with ram 32 in its uppermost position. The switch 82 is now opened and an electrode 30 to be melted secured to ram 32. The system is now ready to begin a melting operation.

In order to initiate the melting operation, switch 56 is moved to a position where the arc voltage control circuit 52 is connected to pulse generator 57. Assuming that circuit breaker 41 is closed, a voltage gradient will be established between the electrode 30 and mold 12. The voltage existing between these two elements is the open circuit voltage, much higher than that of the reference voltage source 54. Consequently, a difference voltage is produced on lead 55 which causes the pulse generator 57 to drive servomotor 60 and the tap on potentiometer 64 in a clockwise direction. Unbalance in the bridge 65 will cause the ram to move downward and the tap on potentiometer 66 to follow that on potentiometer 64. The ram will continue to move downwardly until an arc is struck between the bottom of electrode 30 and the bottom of mold 12. At this point, arc current is first established and the ram is moved upwardly through a predetermined distance, in a manner hereinafter described, to initially establish the desired arc gap.

The system operates under the control of arc voltage with switch 56 in position to interconnect circuits 52 and 57 until a pool is established beneath the electrode 30. This usually takes about one hour in a representative installation. When the arc is struck between the electrode 30 and the bottom of the mold 12, the electrode will begin to melt, and as it melts the arc voltage will increase to the point where it exceeds the reference voltage 54. This produces a signal on lead 55 which rotates the servomotor 60. When servomotor 60 rotates, the tap on potentiometer 64 will be caused to rotate in a clockwise direction, thereby unbalancing the bridge circuit configuration 65 and producing an output signal on leads 76 and 78 to actuate drive motor 40 to move the electrode 30 downwardly. This causes the arc voltage to decrease, and at the same time rotates the tap on potentiometer 66 in a counterclockwise direction to again balance the bridge. If the arc voltage again increases due to continued melting of the electrode, the servomotor 60 will again rotate to move the tap on potentiometer 64 further in a clockwise direction. As will be appreciated, the motor 40 will follow this action to move the electrode 30 downwardly with the tap on potentiometer 66 following that on potentiometer 64 to maintain the bridge balanced.

After a pool has been established beneath the electrode 30, the switch 56 is moved to a position where the pulse generator 57 is connected to lead 86. Under these circumstances, the system is operating under hash control. When hash control is employed, the arc voltage is again sensed; however it is passed through a filter 88 to eliminate the ripple content in the direct current voltage applied to the leads 42 and 44. In certain cases, however, the filter 88 may be eliminated if the hash pulses are of such amplitude that they can be distinguished from the ripple of lower amplitude. From the filter 88, the hash pulses are passed through a pulse shaper 90 which converts them into well-defined square-wave pulses. These pulses, then, are fed to an integrator 92 which, in turn, produces an output signal, the magnitude of which is proportional to hash. This output signal is then applied through switch 56 to pulse generator 57 and controls the servomotor 60 in much the same way as circuit 52, except that in this case the system is controlled as a function of the integral of the hash pulses rather than arc voltage.

In order to raise the electrode 30, a circuit 96 is provided which is adapted to apply a voltage via lead 97 to motor control circuit 59 to cause servomotor 60 and the tap on potentiometer 64 to rotate in a counterclockwise direction.

In order for the raise circuit 96 to be activated and thus cause elevation of the electrode 30, there must be a connection between leads 98 and 100. This connection will exist in a manner hereinafter described only: (1) during strike arc conditions, (2) upon the occurence of a short, or (3) upon the occurrence of a power failure.

The manner in which the two leads 98 and 100 are interconnected so as to cause the electrode to move upwardly will now be described. In series with the lead 42 is a shunt 102 which, in turn, is connected to the energizing coil of a current sensing relay CS. Under normal melting operations, a voltage will be induced across the shunt 102 to energize the relay CS, causing its contacts CS–1 to open. When, however, the contacts CS–1 close upon the failure of direct current in leads 42 and 44, a current relay C will be energized.

Connected across the leads 48 and 50 is a voltage sensing relay VS which is normally energized when arc voltage exists, but which deenergizes when the arc voltage falls below a preset low value, such as, for example, 8 volts. Under these latter circumstances, the contacts VS–1 will close to energize a voltage relay V. In combination with the relays C and V is a strike arc relay SA. This relay SA is controlled by a switch 104, the arrangement being such that during strike arc conditions, the switch 104 is open to deenergize relay SA. However, after the arc is initially established, the switch 104 is closed to energize relay SA. Normally, switch 104 will remain open for about fifteen minutes which is sufficient to establish the arc. As will be understood, switches 104 and 56 may be manually controlled, or controlled automatically by a punch card programmer or the like.

The operation of the system is as follows: It will be assumed that the arc has not yet been struck and that the electrode is moving downwardly toward the bottom of the mold under arc voltage control. Under these circumstances, arc voltage is present but no current is flowing through leads 42 and 44. At the same time, the switch 104 is open to maintain relay SA deenergized. Relays V and SA will be deenergized while relay C is energized due to the absence of arc current. The circuit includes a time relay TD having a pair of normally open contacts TD–1. The relay TD can be energized through contacts V–2 of relay V and contacts SA–2 of relay SA; through contacts V–1 of relay V and contacts SA–1 of relay SA; or through contacts C–1 of relay C and contacts SA–2 of relay SA.

Under the circumstances just described with relays V and SA deenergized, the time delay TD will not be energized and the leads 98 and 100 will not be interconnected.

The electrode is lowered until the arc is initially struck, at which time the arc voltage drops to zero, deenergizing relay VS and energizing relay V. This closes contacts V–1, and since relay SA is deenergized at this time, a circuit is completed through contacts V–1 and SA–1 to the time delay relay TD to close its contacts TD–1, closing the circuit between leads 98 and 100 through contacts SA–3 and TD–1 or through C–2, V–3 and TD–1 and causing the electrode 30 to raise. The electrode starts to withdraw, again establishing arc voltage and causing deenergization of relay V and opening of contacts V–1. Contacts TD–1, however, remain closed until the preset time set in the time delay relay TD times out, and the electrode continues to raise during this time by virtue of the closure of contacts SA–3. Thus, the electrode can continue to withdraw a preset time, which represents a preset distance.

After about fifteen minutes have elapsed, the circuit is placed in its normal run condition by closure of switch 104, whereupon the relay SA becomes energized to reverse the positions of its contacts shown in the drawing. Since both arc voltage and arc current are now present, contacts C–1 and V–2 close, and since contacts SA–2 are now closed, the time delay relay TD will be energized, closing its contacts TD–1. The circuit between leads 98 and 100, however, cannot be completed at this time since there is at least one set of normally open contacts in the three current paths 106, 108 and 110 interconnecting the leads 98 and 100. Thus, in path 106, contacts SA–3 are open; in path 108, contacts C–3 are open; and in path 110 both contacts C–3 and V–4 are open.

When a power failure occurs, both of the relays C and V will be energized due to a failure of both current and voltage, thereby closing contacts V–4 and C–3. When contacts V–4 and C–3 close, a circuit is completed between leads 98 and 100 through contacts SA–4 and contacts TD–1 which will remain closed during the present time of relay TD. However, at the completion of the preset time, relay TD will drop out due to the fact that contacts C–1 and V–2 are open as are contacts SA–1. Consequently, when a power failure occurs, the electrode 30 will move upwardly through a preset distance and stop. Thereafter, when the operator again closes the circuit breaker 41, either arc voltage or hash, as the case may be, will cause it to move downwardly back to its optimum operating position.

A short circuit during normal melting resulting in a reduction of arc voltage to below the preset value of relay VS or in a loss of voltage but not current will cause the electrode 30 to raise through contacts V–3 and C–2 only until the short circuit is cleared, since during a short circuit current is present and contacts C–1 are closed to hold time delay relay TD energized.

The invention thus provides a means for minimizing the possibility of damage to an ingot during a power failure by virtue of the fact that the electrode is moved upwardly through a short distance only upon the occurrence of the power failure. Furthermore, the invention is adaptable for use with either arc voltage control or hash control as is more fully explained in the aforesaid copending application Ser. No. 270,087.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. In a consumable electrode furnace of the type in which an arc normally exists between a consumable electrode and a molten pool of metal beneath it by virtue of the application of electrical power between the electrode and the pool to create arc voltage and arc current; the improvement of apparatus for moving the electrode upwardly and away from the pool upon failure of said power source, comprising means for sensing arc current, means for sensing arc voltage, and mechanism operable in response to the absence of both arc current and arc voltage for causing the electrode to move upwardly and away from the pool.

2. In a consumable electrode furnace of the type in which an arc normally exists between a consumable electrode and a molten pool of metal beneath it by virtue of the application of electrical power between the electrode and the pool to create arc voltage and arc current; the improvement of apparatus for moving the electrode upwardly and away from the pool through a predetermined fixed distance upon failure of said power source, comprising means for sensing arc current, means for sensing arc voltage, mechanism operable in response to the absence of both arc current and arc voltage for causing the electrode to move upwardly and away from the pool through said fixed distance and then stop, and mechanism operable in response to the reestablishment of both arc current and arc voltage for causing the electrode to move downwardly toward the pool.

3. In a consumable electrode furnace of the type in which an arc normally exists between a consumable electrode and a molten pool of metal beneath it by virtue of the application of electrical power between the electrode and the pool to create arc voltage and arc current; the improvement comprising first relay means actuated in response to the existence of arc voltage, second relay means actuated in response to the existence of arc current, time delay relay means actuated for a predetermined period of time only upon deactuation of the first and second relay means, and mechanism for moving the electrode upwardly and away from the molten pool during the period of actuation of the time delay relay means.

4. In a consumable electrode furnace of the type in which an arc normally exists between a consumable electrode and a molten pool of metal beneath it by virtue of the application of electrical power between the electrode and the pool to create arc voltage and arc current; the improvement comprising first relay means actuated in response to the existence of arc voltage, second relay means actuated in response to the existence of arc current, time delay relay means actuated for a predetermined period of time only upon deactuation of the first and second relay means, mechanism for moving the electrode upwardly and away from the molten pool during the period of actuation of the time delay relay means, and apparatus for moving the electrode downwardly toward the pool after lapse of said period of actuation of the time delay relay means and upon re-actuation of the first and second relay means.

5. In a consumable electrode furnace of the type in which an arc normally exists between a consumable electrode within a mold and a molten pool of metal beneath it by virtue of the application of electrical power between the electrode and the mold to create arc voltage and arc current; the combination of first means responsive to the existence of arc voltage and the absence of arc current for causing the electrode to move downwardly toward the mold until an arc is initially struck, second means responsive to the existence of arc current when the arc is initially struck for moving the electrode upwardly through a predetermined distance, and means reponsive to the failure of both arc voltage and arc current after the arc is initially struck for moving the electrode upwardly through said predetermined distance.

6. In a consumable electrode furnace of the type in which an arc normally exists between a consumable electrode within a mold and a molten pool of metal beneath it by virtue of the application of electrical power between the electrode and the mold to create arc voltage and arc current; the combination of first means responsive to the existence of arc voltage and the absence of arc current for causing the electrode to move downwardly toward the mold until an arc is initially struck, second means responsive to the existence of arc current when the arc is initially struck for moving the electrode upwardly through a predetermined distance, means responsive to the failure of both arc voltage and arc current for moving the electrode upwardly through said predetermined distance, and means responsive to the existence of arc current and the absence of arc voltage after the arc is initially struck for moving the electrode upwardly through said predetermined distance.

7. In a consumable electrode furnace of the type in which an arc normally exists between a consumable electrode within a mold and a molten pool of metal beneath it by virtue of the application of electrical power between the electrode and the mold to create arc voltage and arc current; the combination of first relay means actuated in response to the existence of arc voltage, second relay means actuated in response to the existence of arc current, third relay means actuated during the time that the arc is initially struck between the bottom of the electrode and the bottom of the mold, means for causing said electrode to raise upwardly through a predetermined distance upon actuation of said second and third relays and deactuation of the first relay, means for causing said electrode to move upwardly through said predetermined distance upon deactuation of said first, second and third relays, and means for causing said electrode to move upwardly upon deactuation of the first and third relays and actuation of the second relay.

8. In a consumable electrode furnace of the type in which an arc normally exists between the consumable electrode within a mold and a molten pool of metal beneath it by virtue of the application of electrical power between the electrode and the mold to create arc voltage and arc current; the combination of first means responsive to the existence of arc voltage and the absence of arc current for causing the electrode to move downwardly toward the mold until an arc is initially struck, second means responsive to the existence of arc current and the absence of arc voltage when the arc is initially struck for moving the electrode upwardly through a predetermined distance, third means for detecting the occurrence of voltage fluctuations in arc gap voltage which recur at a frequency beneath about thirty cycles per second, fourth means for producing an electrical signal which varies in response to variations in said voltage fluctuations, apparatus for controlling the position of said electrode with respect to said molten pool after the arc is initially struck as a function of said electrical signal, and fifth means responsive to the failure of both arc voltage and arc current after the arc is initially struck for moving the electrode upwardly through said predetermined distance.

9. In a consumable electrode furnace of the type in which an arc normally exists between a consumable electrode within a mold and a molten pool of metal beneath it by virtue of the application of electrical power between the electrode and the mold to create arc voltage and arc current; the combination of first means under the control of arc voltage and responsive to the existence of arc voltage and the absence of arc current for causing the electrode to move downwardly toward the mold until an arc is initially struck, second means responsive to the existence of arc current and the absence of arc voltage when the arc is initially struck for moving the electrode upwardly through a predetermined distance, third means for detecting the existence of voltage fluctuations in arc voltage which recur at a frequency beneath about thirty cycles per second, means for producing an electrical signal which varies in response to variations in said voltage fluctuations, apparatus responsive to said electrical signal for moving the electrode downwardly toward said molten pool as the electrode melts during normal operation of the consumable electrode furnace, and fourth means responsive to the failure of both arc voltage and arc current after the arc is initially struck for moving the electrode upwardly through said predetermined distance.

10. The combination of claim 9 and including means responsive to the failure of arc current alone after the arc is initially struck for moving the electrode upwardly through said predetermined distance.

11. In a consumable electrode furnace of the type in which an arc normally exists between a consumable electrode within a mold and a molten pool of metal beneath it by virtue of the application of electrical power between the electrode and the mold to create arc voltage and arc current; the combination of first means under the control of arc voltage and responsive to the existence of arc voltage and the absence of arc current for causing the electrode to move downwardly toward the mold until an arc is initially struck, second means responsive to the existence of arc current and the absence of arc voltage when the arc is initially struck for moving the electrode upwardly through a predetermined distance, third means responsive to arc voltage for moving the electrode downwardly as it is melted for a predetermined period of time after the arc is initially struck, fourth means for detecting the occurrence of voltage fluctuations in said direct current voltage which recur at a frequency beneath about thirty cycles per second, first means for producing an electrical signal which varies in response to variations in said voltage fluctuations, apparatus operable after lapse of said predetermined period of time following the initiation of the arc and responsive to said electrical signal for moving the electrode downwardly as it is melted, sixth means responsive to the failure of both arc voltage and arc current after the arc is initially struck for moving the electrode upwardly through said predetermined distance, and seventh means responsive to the failure of arc voltage alone after the arc is initially struck for moving the electrode upwardly through said predetermined distance.

References Cited
UNITED STATES PATENTS 2,456,936 12/1948 Frostick _____ 13—13 XR
2,942,045 6/1960 Johnson _____ 13—13

BERNARD A. GILHEANY, *Primary Examiner.*

R. N. ENVALL, JR., *Assistant Examiner.*